United States Patent
Li et al.

(10) Patent No.: US 10,970,593 B2
(45) Date of Patent: Apr. 6, 2021

(54) PRODUCT EFFECT ANALYSIS

(71) Applicant: International Business Machines Corporation, Armonk, NY (US)

(72) Inventors: Jenny S. Li, Cary, NC (US); Lisa Seacat DeLuca, Baltimore, MD (US); Dana L. Price, Surf City, NC (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 16/207,543

(22) Filed: Dec. 3, 2018

(65) Prior Publication Data

US 2020/0175312 A1    Jun. 4, 2020

(51) Int. Cl.
*G06K 9/62* (2006.01)
*G06K 9/00* (2006.01)
*G06Q 30/02* (2012.01)
*G06Q 10/10* (2012.01)

(52) U.S. Cl.
CPC ....... *G06K 9/6202* (2013.01); *G06K 9/00362* (2013.01); *G06Q 10/1095* (2013.01); *G06Q 30/0282* (2013.01)

(58) Field of Classification Search
CPC ............. G06K 9/6202; G06K 9/00362; G06Q 30/0282; G06Q 10/1095
USPC ........................................................ 382/100
See application file for complete search history.

(56) References Cited

U.S. PATENT DOCUMENTS

| 8,238,623 | B2 | 8/2012 | Stephan et al. |
| 9,779,167 | B2 | 10/2017 | Kusumoto et al. |
| 2010/0185064 | A1 | 7/2010 | Bandic et al. |
| 2014/0314315 | A1* | 10/2014 | Chhibber ............. A45D 44/005 382/165 |
| 2016/0210602 | A1* | 7/2016 | Siddique ............ G06Q 30/0605 |
| 2017/0024589 | A1 | 1/2017 | Schumacher et al. |
| 2017/0061609 | A1* | 3/2017 | Son ........................ G16H 20/70 |
| 2017/0138793 | A1 | 5/2017 | Qu et al. |
| 2017/0340267 | A1 | 11/2017 | Shen et al. |
| 2018/0060919 | A1 | 3/2018 | Gu et al. |
| 2018/0085048 | A1* | 3/2018 | Lee ..................... G06K 9/00268 |

* cited by examiner

*Primary Examiner* — Juan A Torres
(74) *Attorney, Agent, or Firm* — Stephen R. Yoder

(57) ABSTRACT

A computer implemented method comprising identifying, by one or more processors, a set of images of an individual and a product purchase history corresponding to the individual, analyzing, by one or more processors, the set of images of an individual, the images being from a defined time window, identifying, by one or more processors, one or more products within the product purchase history that correspond to use within the defined time window, determining, by one or more processors, one or more changes in appearance of the individual based on the analyzed images, determining, by one or more processors, correlations between the determined changes in appearance and the identified products used by the individual, and notifying, by one or more processors, the individual of the determined correlations.

20 Claims, 3 Drawing Sheets

PRODUCT EFFECT ANALYSIS

BACKGROUND OF THE INVENTION

The present invention relates generally to the field of product analysis, and more specifically to determining what effects certain products have on an individual using image analysis.

Many products offer benefits or effects to a user that may achieve varying levels of success for different users. This reality can be particularly apparent with products that are intended to alter a user's appearance in some manner. A user who is seeking to alter his or her appearance in some manner may utilize multiple products over an extended period of time, and it can be difficult to track which products he or she used at what times. For this reason, when a user finally begins seeing a desired result, the user may be unable to pinpoint or identify which product(s) contributed to said desired result.

SUMMARY

As disclosed herein, a computer implemented method for determining product effects on an individual includes identifying, by one or more processors, a set of images of an individual and a product purchase history corresponding to the individual, analyzing, by one or more processors, the set of images of an individual, the images being from a defined time window, identifying, by one or more processors, one or more products within the product purchase history that correspond to use within the defined time window, determining, by one or more processors, one or more changes in appearance of the individual based on the analyzed images, determining, by one or more processors, correlations between the determined changes in appearance and the identified products used by the individual, and notifying, by one or more processors, the individual of the determined correlations. A computer program product and a computer system corresponding to the method are also disclosed.

DETAILED DESCRIPTION

If a user has been using a plurality of products to alter his or her appearance and hasn't been diligently tracking the timeframes in which he/she used each product, it may be extremely difficult for said user to identify which product(s) contributed to a desired a result. Further, a user may be using a variety of products for one purpose that are yielding unintended results (positive or negative) as a side effect, and this user may not be able to pinpoint what change in his or her product use routine caused said side effects. For these reasons, there may be considerable benefit to identifying changes between two or more images of a user and linking said changes to one or more products known to have been purchased by the user.

The present invention will now be described in detail with reference to the Figures. Implementation of embodiments of the invention may take a variety of forms, and exemplary implementation details are discussed subsequently with reference to the Figures.

Figure 1:
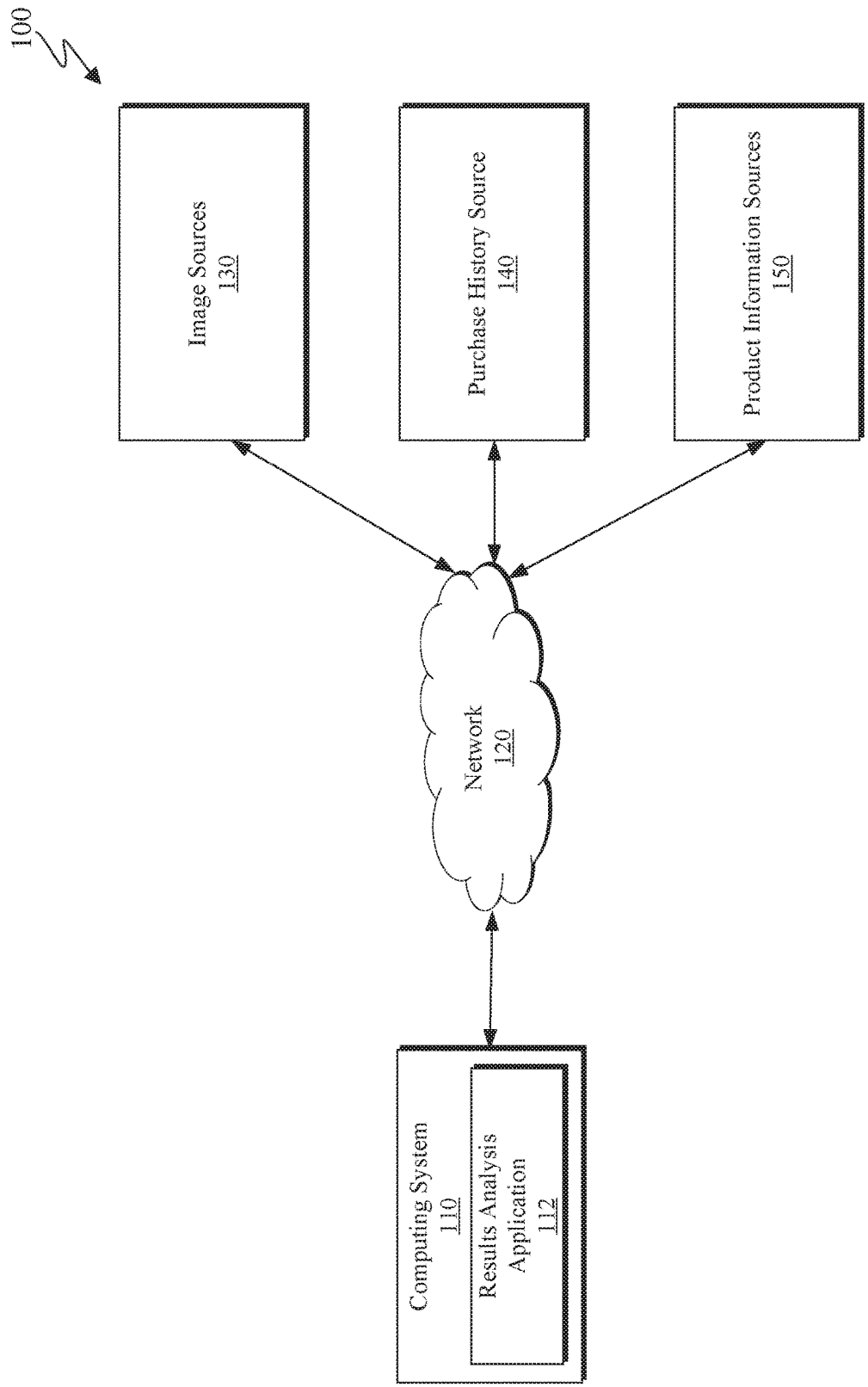
FIG. 1 is a block diagram depicting a user analysis system in accordance with at least one embodiment of the present invention.

FIG. 1 is a block diagram depicting access analysis system 100 in accordance with at least one embodiment of the present invention. As depicted, access analysis system 100 includes computing system 110, network 120, image sources 130, purchase history source 140, and product information sources 150. Access analysis system 100 may enable product effect analysis with respect to an individual.

Computing system 110 can be a desktop computer, laptop computer, specialized computer server, or any other computer system known in the art. In some embodiments, computing systems 110 each represent a computer system utilizing clustered computers and components to act as a single pool of seamless resources. In general, computing system 110 is representative of any electronic device, or combinations of electronic devices, capable of executing machine-readable program instructions, as described in greater detail with regard to FIG. 3.

As depicted, computing system 110 includes results analysis application 112. Results analysis application 112 may be configured to receive, from image sources 130 via network 120, a set of images corresponding to an individual. Results analysis application 112 may additionally be configured to receive purchase history information from purchase history source 140. Results analysis application 112 may additionally be configured to receive product information from product information sources 150. Results analysis application 112 may additionally be configured to query any of image sources 130, purchase history source 140, or product information sources 150 to provide any of the above referenced information available via these sources. In at least some embodiments, results analysis application 112 is configured to execute a results analysis method, such as the results analysis method discussed with respect to FIG. 2.

Network 120 can be, for example, a local area network (LAN), a wide area network (WAN) such as the Internet, or a combination of the two, and include wired, wireless, or fiber optic connections. In general, network 120 can be any combination of connections and protocols that will support communications between computing system 110, image sources 130, purchase history source 140, and product information sources 150 in accordance with an embodiment of the present invention.

Image sources 130 may be any source through which images of an individual are available. Image sources 130 may include a user's camera or cell phone, computer, or other device capable of holding images. Image sources 130 may additionally include social media profiles corresponding to an individual or the individual's friends through which images of the individual are available. Image sources 130 may include any number of network sources or websites capable of hosting images through which images of an individual may be available.

Purchase history source 140 may be any source through which a record of a user's purchases may be available. In at least some embodiments, purchase history source 140 contains records of what products a user has purchased, and when each product was purchased or received by the user. Product information sources 150 may be any sources through which information corresponding to the products purchased by the user may be available. For example, product information sources 150 may include manufacturer websites through which product side effects and intended results are available. Product information sources 150 may include any network sources through which such product side effects and product results are findable.

Figure 2:
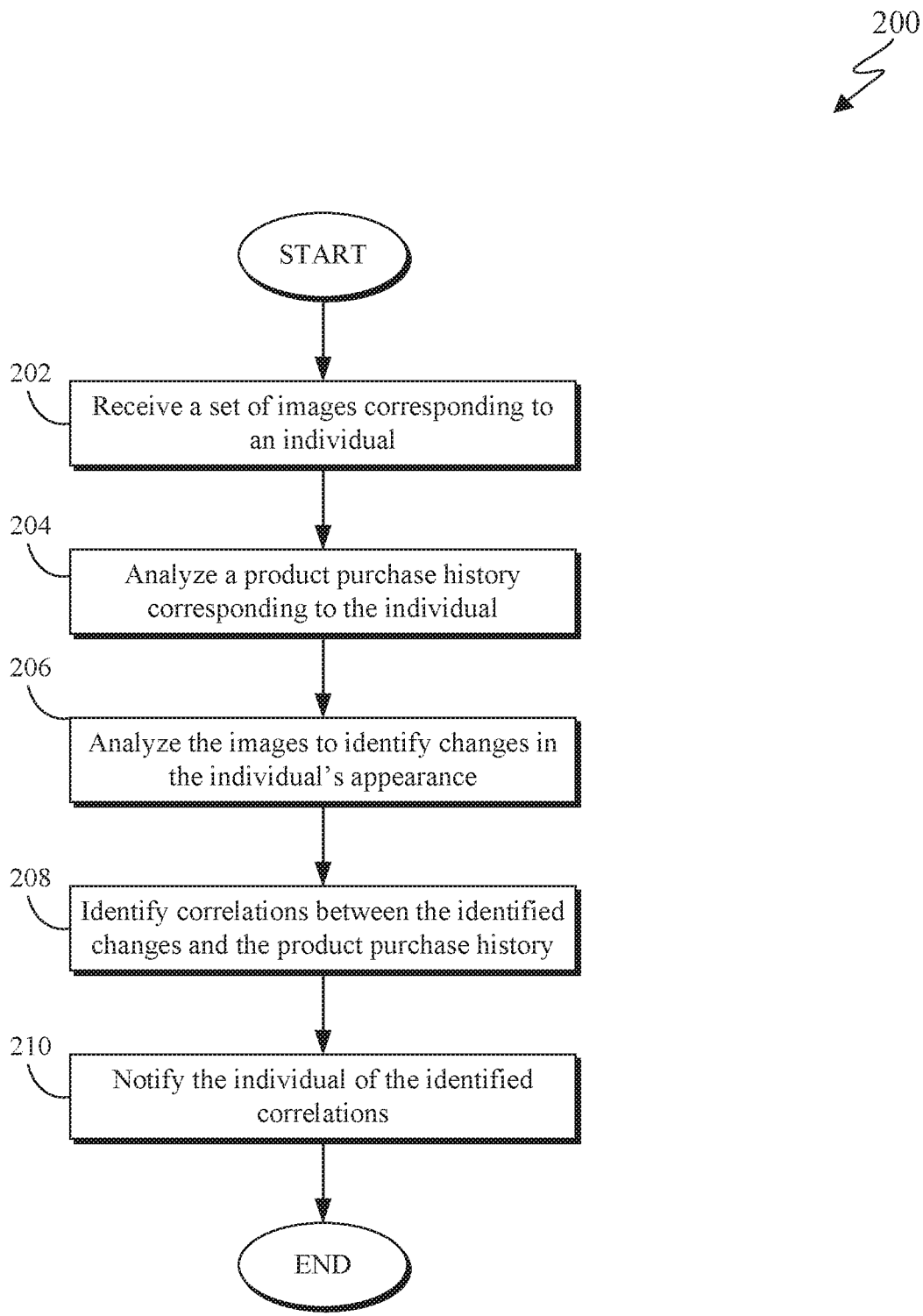
FIG. 2 is a flowchart depicting a results analysis method in accordance with one embodiment of the present invention.

FIG. 2 depicts a results analysis method 200 in accordance with at least one embodiment of the present invention. As depicted, results analysis method 200 includes receiving (202) a set of images corresponding to an individual, analyzing (204) a product purchase history corresponding to the individual, analyzing (206) the set of images to identify one or more changes in the individual's appearance, identifying (208) correlations between the identified changes and the product purchase history, and notifying (210) the individual of the identified correlations. Results analysis method 200 may enable the notification of a user of one or more products that yielded a desired change in his or her appearance.

Receiving (202) a set of images corresponding to an individual may include receiving a plurality of images from one or more external sources. The received plurality of images may include exclusively pictures of an individual; however, in other embodiments, the plurality of images may include a variety of images, some of which may not include the subject individual. In such an embodiment, receiving (202) a set of images corresponding to an individual includes identifying which images of a larger set of images include the individual of interest. To determine which images, if any, include the individual of interest, any known object recognition technique or facial recognition technique known in the art may be leveraged. In some embodiments, a user may be required to provide or select an image of a subject or individual of interest to enable the identification of additional images containing the subject or individual. Receiving (202) a set of images corresponding to an individual can therefore also encompass analyzing a received plurality of images to identify a set of images (selected from the plurality of images) which include the subject or individual of interest. In at least some embodiments, receiving (202) a set of images includes gathering pictures of an individual from his/her own cell phone, camera, or computer, or from social network postings from the individual himself or his/her friends/family members. In some embodiments, receiving (202) a set of images includes actively retrieving the set of images from any of the image sources referenced about.

Analyzing (204) a product purchase history corresponding to the individual may include receiving permissions to access an individual's product purchase history. A product purchase history may be any record in which an individual's transactions are recorded such that a set of products or items purchased by said individual can be viewed and processed. In some embodiments, the product purchase history may be maintained by external sources, such as a merchant's website or other records wherein said merchant stores order information for a user, or such as a credit card website, through which transaction information is stored. In other embodiments, a product purchase history is created independently by an application dedicated to tracking product purchases for use with respect to the disclosed methods.

Analyzing (206) the set of images to identify one or more changes in the individual's appearance may include identifying two or more images of the set of images which were created at different times. In at least some embodiments, a configurable time interval may be utilized such that a user can indicate that only images that were created at times that were at least said time interval apart should be analyzed and compared. In other words, if a user is hoping to identify the effects that a new regiment of products is having on his/her appearance, comparing two images taken seconds apart likely provides little value, as it is highly unlikely any visible changes have occurred. The user may therefore indicate that only images that were created at least 24 hours apart should be compared to one another. In other embodiments, a default time interval may be set automatically, such that no user input is required to identify images for comparison and subsequently analyze the images.

Once two or more images have been selected for comparison, the method continues by analyzing the two or more images with respect to one another. Analyzing (206) the set of images to identify one or more changes in the individual's appearance may include executing image comparisons against any number of pairs of images to provide a set of visible differences in the individual's appearance as depicted in the images. Any known image analysis or image comparison techniques known in the art may be utilized to identify one or more visible differences between the two or more images. Various facial recognition and image processing techniques such as EigenFaces, graph matching, template matching, or feature extraction may be utilized to identify changes in the individual's appearance. Existing techniques for modeling facial wrinkles and skin surface characteristics may also be utilized to identify changes in the individual's appearance. In at least some embodiments, the visible differences in the two or more images may correspond to any of: changes in wrinkles, freckles, or dark spots; changes in hair thickness or texture; weight gain or weight loss; muscular definition; or emotional satisfaction based on the expression of the user.

Identifying (208) correlations between the identified changes and the product purchase history may include analyzing the product purchase history to identify one or more products which correspond to use within the time window corresponding to the identified changes. For example, if a first image, which was captured on November $2^{nd}$, is compared to a second image, which was captured on December $2^{nd}$, to provide a set of identified changes, identifying (208) correlations between the identified changes and the product purchase history may include analyzing the product purchase history to identify products which were purchased by the user in a timeframe such that use of the product may have lined up with the November $2^{nd}$ to December $2^{nd}$ timeframe corresponding to the images. In at least some embodiments, identifying (208) correlations between the identified changes and the product purchase history includes determining when a product was received by the user. If a user purchases a product online on November $2^{nd}$, it is likely he or she may not receive the product for at least a few days; the method may additionally include receiving tracking histories corresponding to products in the product history. The tracking histories may include information regarding whether an item was purchased online, and, if the item was purchased online, when the item was delivered to a user.

Once one or more products are identified that correspond to the time window during which changes were observed, identifying (208) correlations between the identified changes and the product purchase history may additionally include analyzing the identified products to determine which could have caused the changes identified in the images. Analyzing the products in this manner may include executing an internet search for intended results corresponding to the products as well as known side effects of the products. In at least some embodiments, the product purchase history may include information corresponding to the products that includes intended results and side effects. In at least some embodiments, a keyword search may be utilized against the side effects and results of the identified products to determine which of the products advertise relevant results or effects. If no "official" information is available regarding the side effects or results of product use, a keyword search may be conducted against user reviews to determine whether other users have experienced similar changes as a result of a product.

Notifying (210) the individual of the identified correlations may include providing a user with a list of identified changes corresponding to the set of images, as well as a list of products which have been identified as possible causes for the identified changes. In some embodiments, if no products can be tied to the changes based on side effects/results information, notifying (210) the individual of the identified correlations may simply include informing the user of which products he/she was using during the time period corresponding to the identified changes. In at least some embodiments, notifying (210) the individual of the identified correlations may additionally include providing the user with a link or prompt to purchase any identified products. Notifying (210) the individual of the identified correlations may additionally include providing the user with the images that were the basis for these results, such that the user can view the change himself and possibly determine whether he would like to purchase the product again.

Notifying (210) the individual of the identified correlations may additionally include prompting the user to either agree or disagree with the correlation. The user's agreement/disagreement could be aggregated into a review of the product, or could enable the user to indicate that some variable beyond the products identified by the system caused the identified changes. Notifying (210) the individual of the identified correlations may additionally include storing information regarding the identified correlations, and notifying a user when he/she attempts to purchase a product again that had previously yielded a negative correlation.

It should be appreciated that while the terms "products" and "items" are used above, results analysis method 200 can also be executed with respect to program enrollments (such as, but not limited to, gym memberships, chiropractic appointments, fitness center sessions, yoga sessions, physical therapy appointments, etc.) that would cause a change in a user's appearance. In such cases, instead of product purchase histories, enrollment information or class/appointment attendance information could be utilized to determine a timeframe during which the user could have been affected by any of the above activities.

Results analysis method 200 may additionally, at any point, include determining that an individual has authorized access to/analysis of his/her images. In one scenario, a user authorizes a results analysis program to utilize all image sources that are available for results analysis program 112 to access. In another scenario, a user of authorizes a results analysis application to access photos from a first source but not photos from a second source. In additional embodiments, a results analysis program can access publicly available information (such as images available via publicly viewable social media profiles, etc.) to identify images of an individual.

Figure 3:
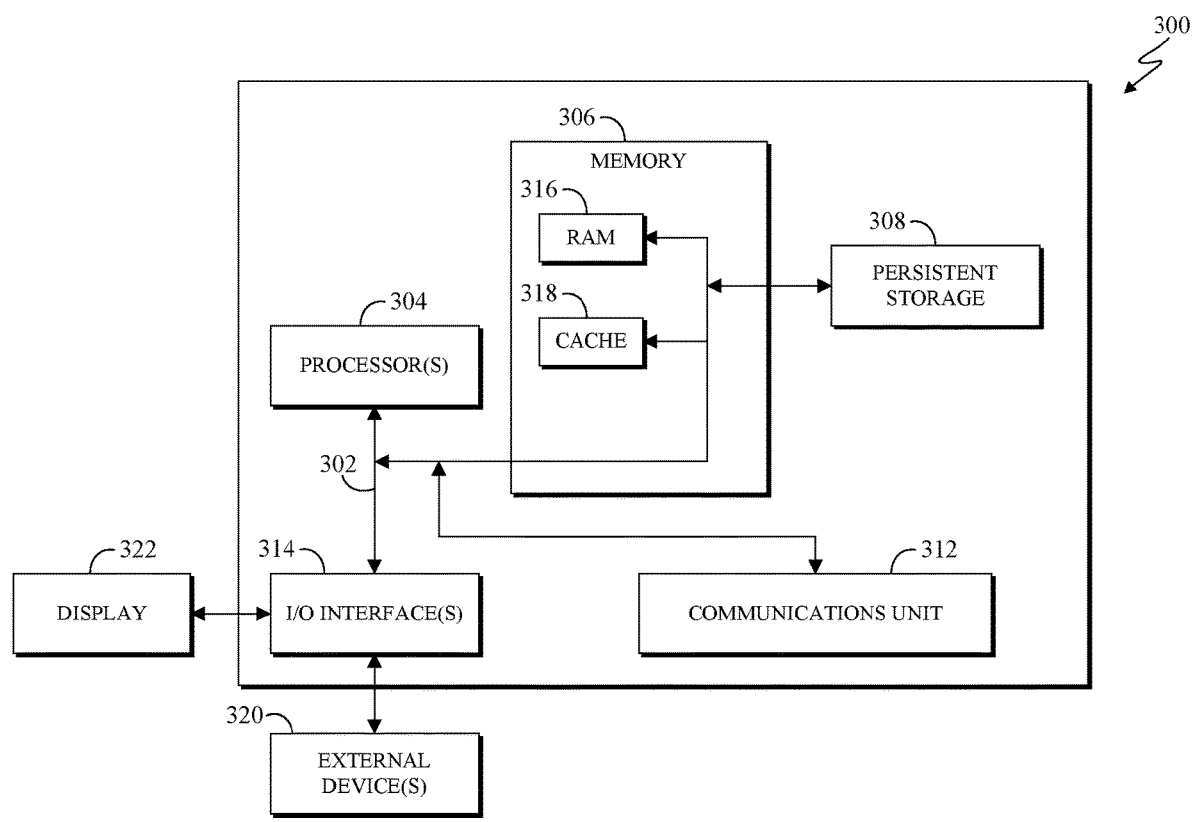
FIG. 3 depicts a block diagram of components of a computer, in accordance with some embodiments of the present invention.

FIG. 3 depicts a block diagram of components of computer 300 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

As depicted, the computer 300 includes communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

One or more programs may be stored in persistent storage 308 for access and/or execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links.

I/O interface(s) 314 allows for input and output of data with other devices that may be connected to computer 300. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 308 via I/O interface(s) 314. I/O interface(s) 314 also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for determining effects of products on an individual, the method comprising:
   identifying, by one or more processors, a set of images of an individual and a product purchase history corresponding to the individual;
   analyzing, by one or more processors, the set of images of the individual, the images being from a defined time window;
   identifying, by one or more processors, one or more products within the product purchase history that correspond to use within the defined time window;
   determining, by one or more processors, one or more changes in appearance of the individual based on the analyzed images;
   determining, by one or more processors, correlations between the determined changes in appearance and the identified products used by the individual; and
   notifying, by one or more processors, the individual of the determined correlations.

2. The computer implemented method of claim 1, further comprising:
   receiving a set of appointment information, wherein the appointment information includes timeframe information corresponding to one or more classes, activities or appointments that could impact the user's appearance; and
   determining correlations between the determined changes in appearance and the set of classes, activities, or appointment information.

3. The computer implemented method of claim 1, wherein notifying the individual of the determined correlations includes prompting the user to endorse a product based on the determine correlations.

4. The computer implemented method of claim 1, further comprising storing the determined correlations and the corresponding determined changes.

5. The computer implemented method of claim 1, further comprising enabling a user to select the defined time window.

6. The computer implemented method of claim 3, further comprising generating a review of the product including the user's endorsement.

7. The computer implemented method of claim 4, further comprising:
   determining whether a purchase attempt made by a user corresponds to a product indicated by at least one of the stored determined correlations; and
   alerting the user of the stored determined correlation corresponding to the product.

8. A computer program product comprising:
   one or more computer readable storage media and program instructions stored on the one or more computer readable storage media, the program instructions comprising instructions to:
   identify, by one or more processors, a set of images of an individual and a product purchase history corresponding to the individual;
   analyze, by one or more processors, the set of images of the individual, the images being from a defined time window;
   identify, by one or more processors, one or more products within the product purchase history that correspond to use within the defined time window;
   determine, by one or more processors, one or more changes in appearance of the individual based on the analyzed images;
   determine, by one or more processors, correlations between the determined changes in appearance and the identified products used by the individual; and
   notify, by one or more processors, the individual of the determined correlations.

9. The computer program product of claim 8, further comprising instructions to:
   receive a set of appointment information, wherein the appointment information includes timeframe information corresponding to one or more classes or appointments that could impact the user's appearance; and
   determine correlations between the determined changes in appearance and the set of appointment information.

10. The computer program product of claim 8, wherein notifying the individual of the determined correlations includes prompting the user to endorse a product based on the determine correlations.

11. The computer program product of claim 8, further comprising instructions to store the determined correlations and the corresponding determined changes.

12. The computer program product of claim 8, further comprising instructions to enable a user to select the defined time window.

13. The computer program product of claim 10, further comprising instructions to generate a review of the product including the user's endorsement.

14. The computer program product of claim 11, further comprising instructions to:
   determine whether a purchase attempt made by a user corresponds to a product indicated by at least one of the stored determined correlations; and
   alert the user of the stored determined correlation corresponding to the product.

15. A computer system comprising:
   one or more computer processors;
   one or more computer readable storage media;
   program instructions stored on the one or more computer readable storage media, the program instructions comprising instructions to:
   identify, by one or more processors, a set of images of the individual and a product purchase history corresponding to the individual;
   analyze, by one or more processors, the set of images of an individual, the images being from a defined time window;
   identify, by one or more processors, one or more products within the product purchase history that correspond to use within the defined time window;
   determine, by one or more processors, one or more changes in appearance of the individual based on the analyzed images;
   determine, by one or more processors, correlations between the determined changes in appearance and the identified products used by the individual; and
   notify, by one or more processors, the individual of the determined correlations.

16. The computer system of claim 15, further comprising instructions to:
   receive a set of appointment information, wherein the appointment information includes timeframe information corresponding to one or more classes or appointments that could impact the user's appearance; and
   determine correlations between the determined changes in appearance and the set of appointment information.

17. The computer system of claim 15, wherein notifying the individual of the determined correlations includes prompting the user to endorse a product based on the determine correlations.

18. The computer system of claim 15, further comprising instructions to store the determined correlations and the corresponding determined changes.

19. The computer system of claim 17, further comprising instructions to generate a review of the product including the user's endorsement.

20. The computer system of claim 18, further comprising instructions to:
   determine whether a purchase attempt made by a user corresponds to a product indicated by at least one of the stored determined correlations; and
   alert the user of the stored determined correlation corresponding to the product.

* * * * *